(12) United States Patent
Kim et al.

(10) Patent No.: US 8,072,865 B2
(45) Date of Patent: Dec. 6, 2011

(54) MULTI-LAYERED HIGH-DENSITY RECORDING MEDIUM AND OPTICAL POWER ADJUSTING METHOD THEREFOR

(75) Inventors: Jin Yong Kim, Kyunggi-do (KR); Sang Woon Suh, Seoul (KR)

(73) Assignee: LG Electronics Inc., Seoul (KR)

( * ) Notice: Subject to any disclaimer, the term of this patent is extended or adjusted under 35 U.S.C. 154(b) by 22 days.

(21) Appl. No.: 10/468,675

(22) PCT Filed: Jun. 5, 2003

(86) PCT No.: PCT/KR03/01110
§ 371 (c)(1),
(2), (4) Date: Aug. 21, 2003

(87) PCT Pub. No.: WO03/105139
PCT Pub. Date: Dec. 18, 2003

(65) Prior Publication Data
US 2005/0013216 A1    Jan. 20, 2005

(30) Foreign Application Priority Data
Jun. 7, 2002 (KR) .................. 10-2002-0032049

(51) Int. Cl.
G11B 7/00 (2006.01)
(52) U.S. Cl. .................. 369/59.25; 369/94; 369/47.5
(58) Field of Classification Search .................. None
See application file for complete search history.

(56) References Cited

U.S. PATENT DOCUMENTS

| | | | |
|---|---|---|---|
| 5,365,507 A | 11/1994 | Fuji et al. | |
| 5,414,451 A * | 5/1995 | Sugiyama et al. | 347/258 |
| 5,608,715 A * | 3/1997 | Yokogawa et al. | 369/275.1 |
| 5,768,221 A | 6/1998 | Kasami et al. | |
| 6,052,347 A | 4/2000 | Miyata | |
| 6,072,759 A | 6/2000 | Maeda et al. | |
| 6,101,162 A | 8/2000 | Kim | |
| 6,172,955 B1 | 1/2001 | Hashimoto | |
| 6,370,102 B1 | 4/2002 | Mons et al. | |
| 6,404,713 B1 | 6/2002 | Ueki | |
| 6,510,128 B2 | 1/2003 | Sekii | |
| 6,512,731 B1 | 1/2003 | Seo et al. | |
| 6,606,285 B1 | 8/2003 | Ijtsma et al. | |

(Continued)

FOREIGN PATENT DOCUMENTS

CN    1231473    10/1999

(Continued)

OTHER PUBLICATIONS

Office Action for U.S. Appl. No. 10/485,914 dated Mar. 20, 2009.

(Continued)

*Primary Examiner* — Joseph Haley
(74) *Attorney, Agent, or Firm* — Harness, Dickey & Pierce, P.L.C.

(57) ABSTRACT

A multi-layered high-density recording medium and an optical power adjusting method therefor. A multi-layered high-density recording medium includes multiple recording layers each of which contains optical power related information for all layers. An optical power adjusting method reading first optical power related information for all layers from a multi-layered optical disk placed in a disk player, storing the read information in another storage device, and making a current optical power apparatus to a moved layer without necessarily having to access the multi-layered optical disk by referring to the stored optical power related information when moving to another layer during record or reproduction.

30 Claims, 6 Drawing Sheets

U.S. PATENT DOCUMENTS

| | | | |
|---|---|---|---|
| 6,611,492 B2 | 8/2003 | Akimori et al. | |
| 6,728,177 B2 * | 4/2004 | Seong et al. | 369/47.4 |
| 6,728,186 B2 * | 4/2004 | Weijenbergh et al. | 369/59.25 |
| 6,801,494 B2 * | 10/2004 | Ross | 369/275.3 |
| 6,842,412 B2 | 1/2005 | Ushiyama | |
| 6,845,071 B2 * | 1/2005 | Shoji et al. | 369/47.53 |
| 6,859,426 B1 * | 2/2005 | Ogawa et al. | 369/47.53 |
| 6,917,572 B2 * | 7/2005 | Iida et al. | 369/47.21 |
| 7,295,762 B2 | 11/2007 | Sawabe et al. | |
| 7,376,058 B2 | 5/2008 | Narumi et al. | |
| 2002/0021656 A1 | 2/2002 | Tsukagoshi | |
| 2002/0122365 A1 | 9/2002 | Ueki | |
| 2003/0048733 A1 | 3/2003 | Heemskerk et al. | |
| 2003/0063535 A1 | 4/2003 | Shoji et al. | |
| 2003/0072233 A1 | 4/2003 | Naoi et al. | |
| 2003/0081523 A1 | 5/2003 | Miyagawa | |
| 2003/0137909 A1 | 7/2003 | Ito et al. | |
| 2003/0169651 A1 | 9/2003 | Kobayashi | |
| 2003/0210627 A1 | 11/2003 | Ijtsma et al. | |
| 2004/0085874 A1 | 5/2004 | Akiyama et al. | |

FOREIGN PATENT DOCUMENTS

| | | |
|---|---|---|
| CN | 01116247.3 | 2/2001 |
| EP | 0 768 652 | 10/1996 |
| EP | 0 899 735 | 3/1999 |
| EP | 1 300 836 | 4/2003 |
| EP | 1 329 880 | 7/2003 |
| JP | 61-260438 | 11/1986 |
| JP | 03-157816 | 7/1991 |
| JP | 03-290872 | 12/1991 |
| JP | 05-028644 | 2/1993 |
| JP | 05-101398 | 4/1993 |
| JP | 05-189765 A | 7/1993 |
| JP | 08-096406 | 4/1996 |
| JP | 08-212561 | 8/1996 |
| JP | 09-231613 | 9/1997 |
| JP | 10-011755 | 1/1998 |
| JP | 10-11755 A | 1/1998 |
| JP | 10-228645 | 8/1998 |
| JP | 10-241167 | 9/1998 |
| JP | 10-320926 | 12/1998 |
| JP | 11-025608 | 1/1999 |
| JP | 11-242565 | 9/1999 |
| JP | 12-311346 A | 11/2000 |
| JP | 2000-322875 | 11/2000 |
| JP | 2001-014808 | 1/2001 |
| JP | 13-052337 A | 2/2001 |
| JP | 2001-086195 | 3/2001 |
| JP | 2001-209940 | 3/2001 |
| JP | 2001-143402 | 5/2001 |
| JP | 2001-319357 | 11/2001 |
| JP | 2002-050053 | 2/2002 |
| JP | 2002-352430 | 12/2002 |
| JP | 2003-030842 | 1/2003 |
| JP | 2003-178448 | 6/2003 |
| KR | 10-1997-0055600 | 10/1997 |
| TW | 484135 | 4/2002 |
| WO | WO 96/19807 | 6/1996 |
| WO | WO 01/22416 | 3/2001 |
| WO | WO 03/019543 | 3/2003 |

OTHER PUBLICATIONS

Search Report for European patent application No. 07017017.0 dated Mar. 16, 2009.
ECMA: Standardizing Information and Communication Systems: Standard ECMA-272, $2^{nd}$ edition: 120 mm DVD Rewritable Disk (DVD-RAM) Standard ECMA-272, XX, XX, No. 272, Jun. 1, 1999, pp. 43-55, XP002186767.
Office Action by the Japanese Patent Office dated Apr. 27, 2010 for JP 2006-194024, without translation.
JIS-X-6243 "120mm DVD-RAM" (without translation).
Japanese Office Action issued in corresponding Japanese application No. 2007-121293, no English translation.
Japanese Office Action dated Feb. 22, 2011 issued in corresponding Japanese application No. 2007-121293.
Taiwanese Office Action dated Mar. 7, 2011 issued in corresponding Taiwanese application No. TW 92115451.
Office Action for Japanese Patent Publication No. 2007-121293 dated Oct. 2, 2007.
Office Action for Japanese Patent Publication No. 2007-121293 dated Jun. 10, 2008.
Office Action for European patent application No. 03757211.2-2210/1518228 dated Jun. 27, 2008.
Search Report for international patent application No. PCT/KR03/01116 dated Oct. 6, 2003.
Office Action for Chinese patent application No. 03800989.7 dated Feb. 10, 2006.
Office Action for U.S. Appl. No. 10/485,914 dated Feb. 22, 2006.
Office Action for Japanese patent application No. 2004-512132 dated Nov. 14, 2006.
Office Action for Japanese patent application No. 2006-194024 dated Jun. 5, 2007.
Office Action for U.S. Appl. No. 11/499,663 dated Jul. 24, 2007.
Office Action for Japanese patent application No. 2006-194024 dated Oct. 30, 2007.
Office Action for Korean patent application No. 10-2002-0032183 dated Aug. 21, 2008.
Office Action for U.S. Appl. No. 11/499,663 dated Oct. 29, 2008.

* cited by examiner

FIG. 1
*Background Art*
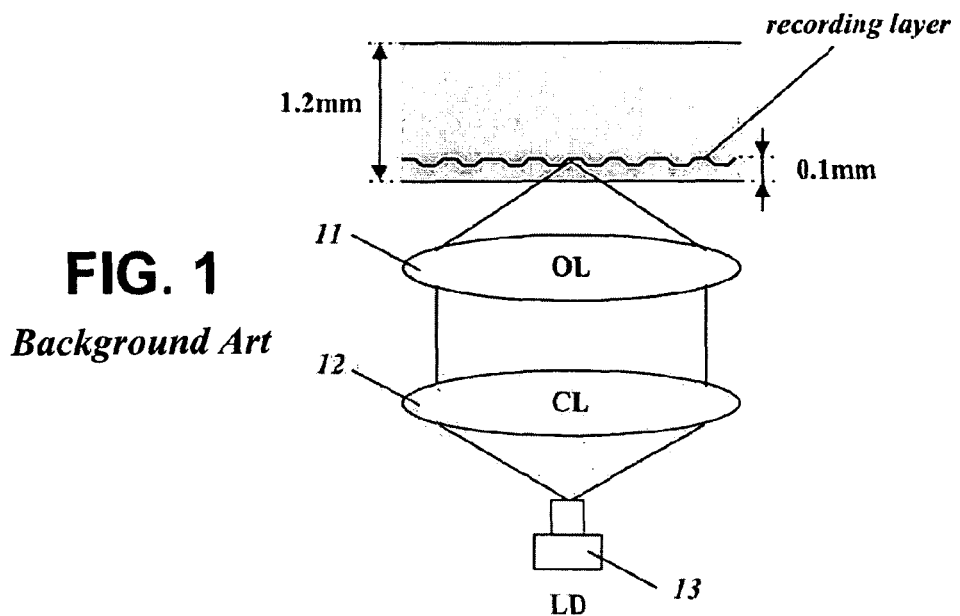
FIG. 2 *Background Art*
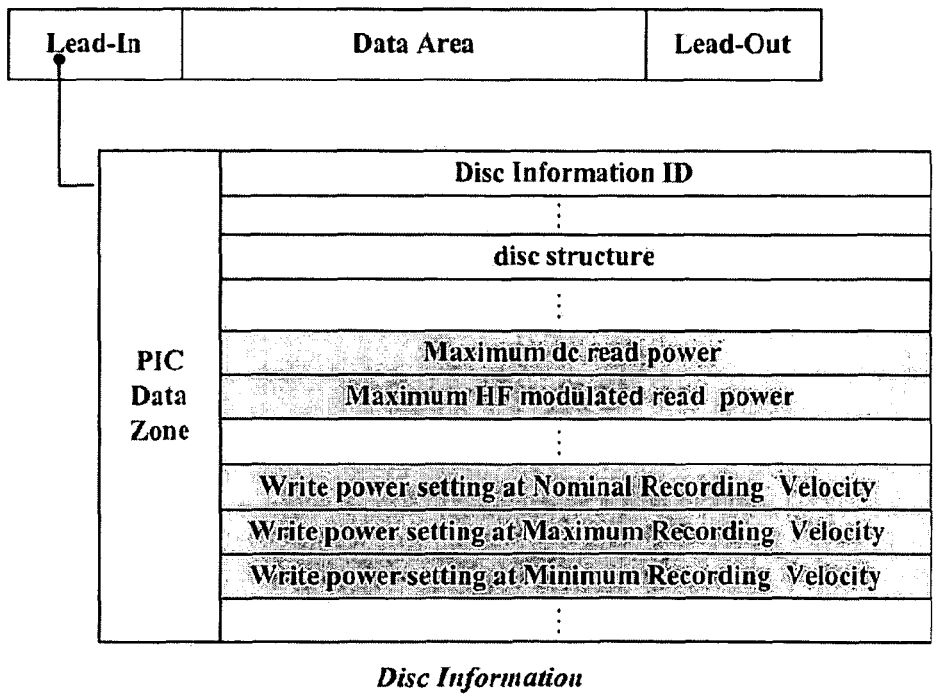
*Disc Information*

FIG. 5

| | Disc Information ID |
|---|---|
| | ⋮ |
| | disc structure ('0000 0010') = DL |
| | ⋮ |
| PIC Data Zone | Maximum dc read power for Layer 1 |
| | Maximum dc read power for Layer 2 |
| | Maximum HF modulated read power for Layer 1 |
| | Maximum HF modulated read power for Layer 2 |
| | ⋮ |
| | Write power setting at Nominal Recording Velocity for Layer 1 |
| | Write power setting at Nominal Recording Velocity for Layer 2 |
| | Write power setting at Maximum Recording Velocity for Layer 1 |
| | Write power setting at Maximum Recording Velocity for Layer 2 |
| | Write power setting at Minimum Recording Velocity for Layer 1 |
| | Write power setting at Minimum Recording Velocity for Layer 2 |
| | ⋮ |

FIG. 6

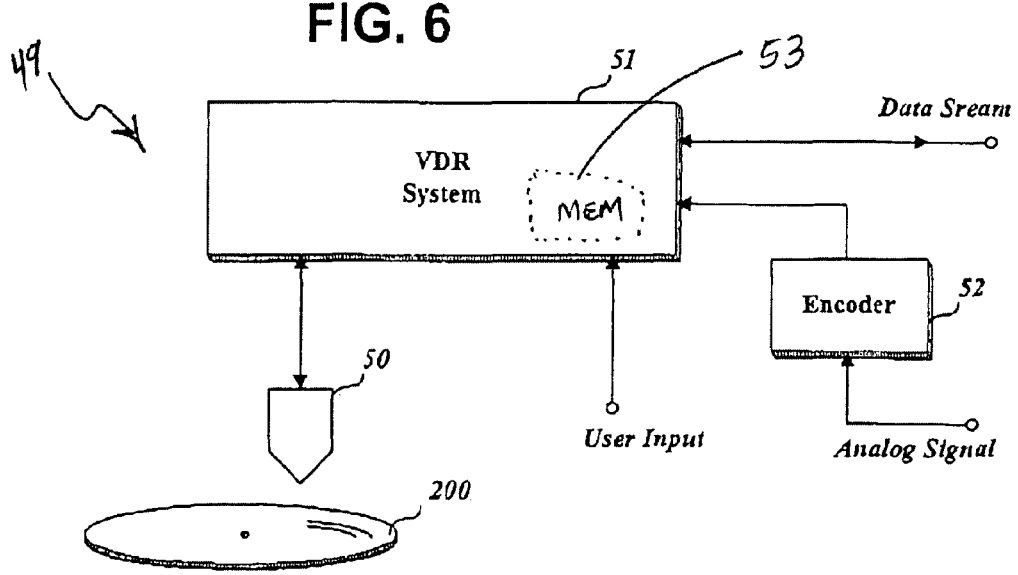

FIG. 9A

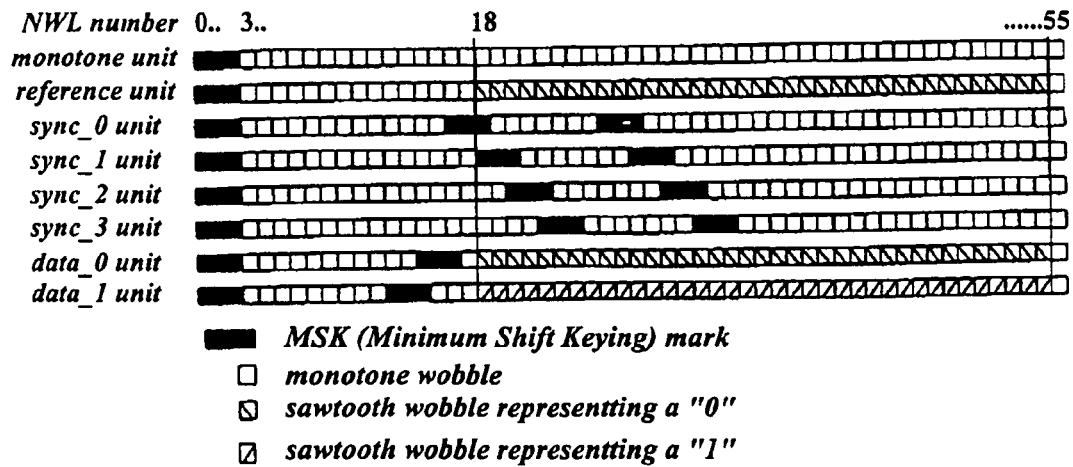

- ■ MSK (Minimum Shift Keying) mark
- □ monotone wobble
- ▧ sawtooth wobble representting a "0"
- ▨ sawtooth wobble representting a "1"

FIG. 9B

| ADIP Unit Number | ADIP Unit Type | ADIP Nibble Bit Number | ADIP Codeword Nibble Number |
|---|---|---|---|
| 0 | monotone | — | |
| 1 | sync_0 | — | |
| 2 | monotone | — | |
| 3 | sync_1 | — | |
| 4 | monotone | — | — |
| 5 | sync_2 | — | |
| 6 | monotone | — | |
| 7 | sync_3 | — | |
| 8 | reference | — | |
| 9 | data_x | b3 | |
| 10 | data_x | b2 | c0 |
| 11 | data_x | b1 | |
| 12 | data_x | b0 | |
| ⋮ | ⋮ | — | — |
| 8+i*5 | reference | — | — |
| 9+i*5 | data_x | b3 | |
| 10+i*5 | data_x | b2 | $c_i$ |
| 11+i*5 | data_x | b1 | |
| 12+i*5 | data_x | b0 | |
| ⋮ | ⋮ | — | — |
| 78 | reference | — | — |
| 79 | data_x | b3 | |
| 80 | data_x | b2 | c14 |
| 81 | data_x | b1 | |
| 82 | data_x | b0 | |

MULTI-LAYERED HIGH-DENSITY RECORDING MEDIUM AND OPTICAL POWER ADJUSTING METHOD THEREFOR

PRIORITY STATEMENT

This application is the national phase under 35 U.S.C. §371 of PCT International Application No. PCT/KR03/01110 which has an International filing date of Jun. 5, 2003, which designated the United States of America, the entire contents of which are hereby incorporated by reference.

TECHNICAL FIELD

One or more embodiments of the present invention relates to a multi-layered high-density recording medium and an optical power adjusting method therefor.

BACKGROUND

Recently, the standardization for Blu-ray Rewritable (referred to as BD-RE hereinafter), which is a new high-density rewritable optical disk, capable of recording high-quality video and audio data for a long time, is in rapid progress. BD-RE related products will be available on the market when the standardization is completed.

The data recording layer of a single-layered BD-RE disk is located at a distance of 0.1 mm from the disk surface in the direction normal to an objective lens 11 contained in an optical pickup, as illustrated in FIG. 1.

For recording/reproducing data on/from the recording layer of the BD-RE, the laser power of a laser diode (LD) 13 contained in the optical pickup is adjusted according to the operation mode, which will be described in detail below.

FIG. 2 shows a table of disk information recorded in the lead-in area of a conventional single-layered BD-RE. The lead-in area comprises a pre-recorded area and a rewritable area and the pre-recorded area includes a PIC (Permanent Information & Control) data zone.

As illustrated in FIG. 2, information such as the disk information ID, the disk structure, a maximum DC read power and a maximum high-frequency modulated read power for adjusting read power is recorded in the PIC data zone.

Also, write power settings at a normal recording velocity, write power settings at a maximum recording velocity, and write power settings at a minimum recording velocity for adjusting write power are recorded in the PIC data zone.

An optical disk apparatus in which the BD-RE having the information shown in FIG. 2 is placed adjusts the amount of the current that flows through the LD contained in the optical pickup optimal to the present operation mode by referring to the disk information stored in the PIC data zone before beginning to reproduce data recorded on the recording layer of the BD-RE or to record data on the recording layer of the ED-RE.

On the other hand, dual-layered BD-RE disks having a storage capacity twice as much as that of a single-layered BD-RE disk have been proposed. A dual-layered BD-RE has two recording layers, Layer 1 and Layer 2, located at a prescribed distance (d2) away from each other, as illustrated in FIG. 3.

The optical power of the LD 13 needs to be adjusted appropriately for recording data on a selected layer or reproducing data from a layer in the same way as the case for a single-layered disk. If optical power related information only for either of the layers is recorded or an identical optical power is employed for both layers, the recording/reproducing performance is likely to be deteriorated on one of the two layers. For example, suppose that an optical read power set appropriately for Layer 1 is used to read data recorded on Layer 2. A portion of the laser beam reflected by Layer 2 is reflected again by Layer 1 located below. Also, a portion of the laser beam created by the LD 13 is reflected by Layer 1 before reaching Layer 2, which results in an optical loss. For these reasons, the data recorded on Layer 2 may not be read successfully, though data reproduction from Layer 1 is successful.

As a result, it is required to maintain optical power related information for each of the recording layers separately. Optical power related data for Layer 1 is recorded in the lead-in area of Layer 1 and optical power related data for Layer 2 is recorded in the lead-out area of Layer 2. When jumping from Layer 1 to Layer 2 in the middle of a reproducing/reading operation on Layer 1, the reproducing/reading operation on Layer 2 cannot start immediately after the jump. Rather, there is a delay until the optical power related information recorded on the lead-out area of Layer 2 is accessed.

SUMMARY

At least one embodiment of the present invention solves the foregoing problems. One or more example embodiments of the present invention provide a multi-layered high-density recording medium and an optical power adjusting method, respectively, by which optical power can be adjusted relative to (if not optimally to) each of the recording layers substantially immediately after a layer jump operation is performed, thereby allowing a fast start of a read/write operation after the layer jump.

A high-density optical disk in accordance with an embodiment of the present invention includes a plurality of recording layers each of which contains optical power related information for each of the plurality of recording layers.

An optical power adjustment method in accordance with an embodiment of the present invention comprises the steps of reading optical power related information for all of a plurality of recording layers from a multi-layered optical disk placed in an apparatus and storing the optical power related information; searching the stored information to find corresponding optical power adjustment information for a recording layer that is the target of a requested reproducing/recording operation; and setting an optical power appropriate for the recording layer by referring to the corresponding optical power adjustment information.

Another optical power adjustment method in accordance with an embodiment of the present invention comprises the steps of: reading optical power related information for all of a plurality of recording layers from a multi-layered optical disk placed in an apparatus and storing the optical power related information in a storage means; and, in case of jumping to another recording layer during a recording or reproducing session on a recording layer, setting an optical power appropriate for the recording layer that is the target of the jump operation by referring to the optical power related information stored in the storage means without accessing the optical disk and continuing the recording or reproducing operation on the target recording layer.

At least one of the high-density multi-layered optical disks and the optical power adjustment in accordance with embodiments of the present invention, respectively, can provide fast optical power adjustment capability and thereby can reduce if not prevent a momentary pause of recording/reproducing operation even in case of layer jumps.

Additional features and advantages of the present invention will be more fully apparent from the following detailed description of example embodiments, the accompanying drawings and the associated claims.

BRIEF DESCRIPTION OF THE DRAWINGS

The accompanying drawings are intended to depict example embodiments of the present invention and should not be interpreted to limit the scope thereof. The accompanying drawings are not to be considered as drawn to scale unless explicitly noted.

FIG. 1 illustrates the structure of a single-layered disk and an optical pickup for accessing the disk, according to the Background Art;

FIG. 2 illustrates a table of disk information recorded in the lead-in area of a single-layered BD-RE, according to the Background Art;

FIG. 5 illustrates a table of disk information stored in the PIC data zone assigned in a dual-layered optical disk in accordance with an embodiment of the present invention;

FIG. 6 illustrates an optical disk apparatus according to an embodiment of the present invention;

FIGS. 9a and 9b illustrate the structure of ADIP words in which optical power adjustment-related information for a plurality of recording layers is stored, according to an embodiment of the present invention.

DETAILED DESCRIPTION OF EXAMPLE EMBODIMENTS

In order that the present invention may be fully understood, example embodiments thereof will now be described with reference to the accompanying drawings.

Figure 3:
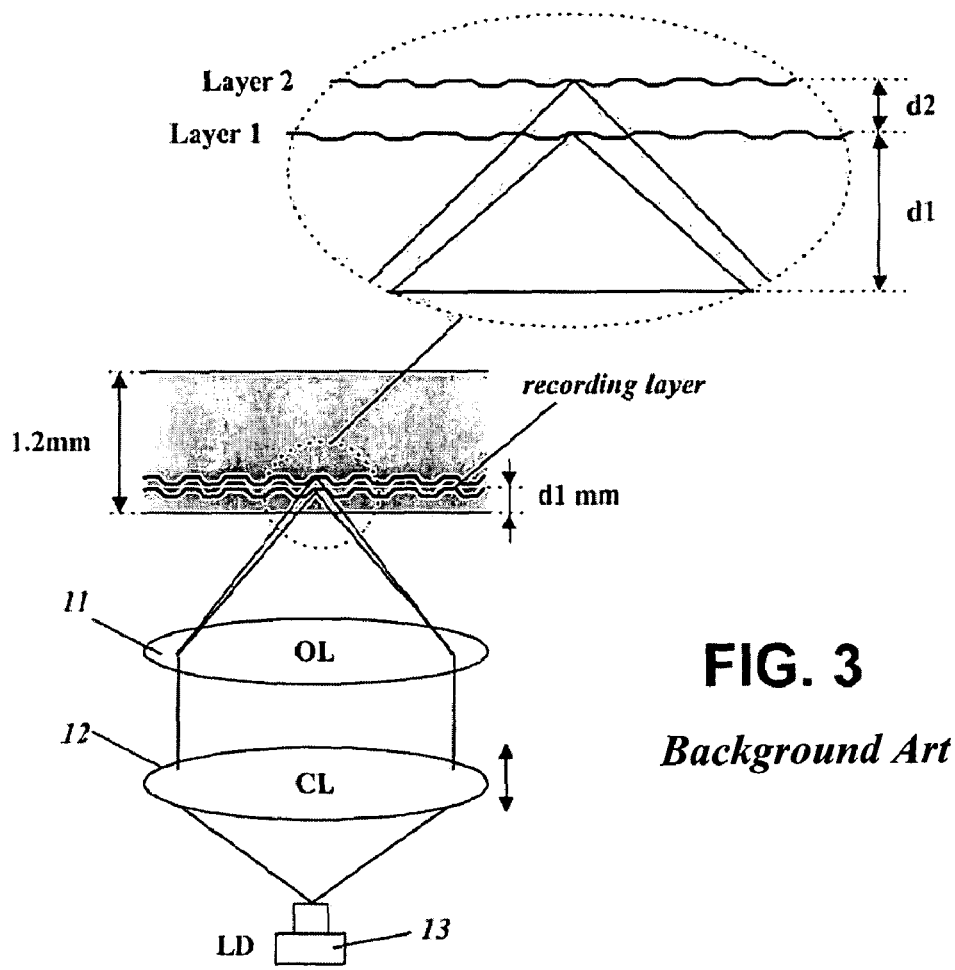
FIG. 3 illustrates the structure of a dual-layered disk and an optical pickup for accessing the disk, according to the Background Art.
Figure 4:
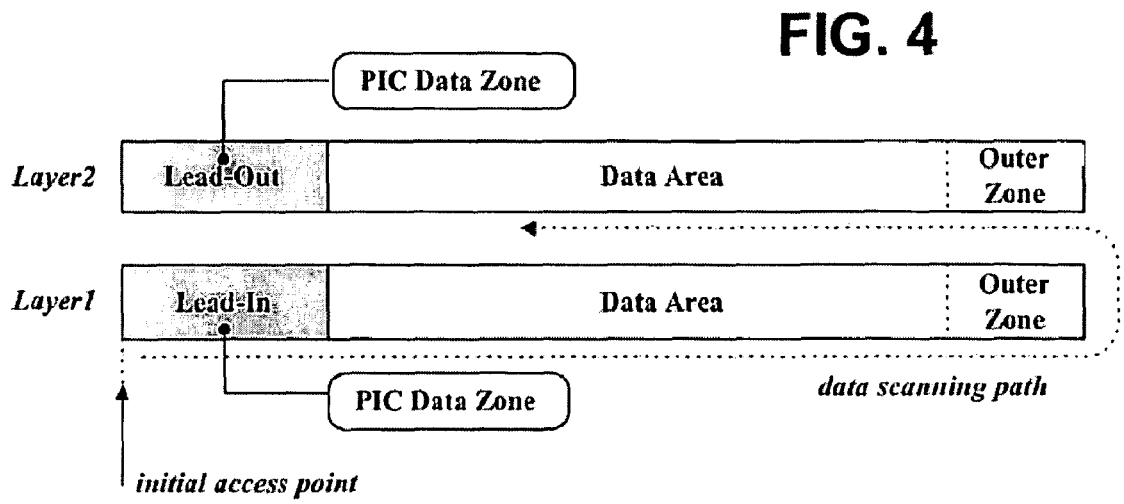
FIG. 4 illustrates PIC data zones assigned to lead-in and lead-out areas of a high-density dual-layered optical disk in accordance with an embodiment of the present invention.

FIG. 4 illustrates the structure of a dual-layered BD-RE disk in accordance with an embodiment of the present invention, wherein a lead-in area and a lead-out area of the disk exist on Layer 1 and Layer 2 respectively and each layer has an outer zone in the outer-diameter of the disk.

The lead-in area of Layer 1 and lead-out area of Layer 2 include separate PIC data zones that contain the same optical power related data for adjusting read/write optical power for both recording layers.

In other words, the PIC data zones recorded in the lead-in area of Layer 1 and lead-out area of Layer 2 contain the same disk information. As illustrated in FIG. 5, the disk information includes disk information ID and disk structure information. The disk structure information is an identification number indicative of a dual-layered optical disk. The identification number may indicate the number of recording layers. For example, '0000 0011' indicates a three-layer disk, '0000 0010' indicates a dual-layered disk (and is the non-limiting sample value assumed and depicted in FIG. 5), and '0000 0001' indicates a single-layered disk.

The disk information further includes a maximum DC read power for Layer 1, a maximum DC read power for Layer 2, a maximum high-frequency modulated read power for Layer 1, and a maximum high-frequency modulated read power for Layer 2. Such information in whole or in part can be used for adjusting read powers appropriately to Layer 1 and Layer 2.

The disk information further can include write power settings at a normal recording velocity for Layer 1, write power settings at a normal recording velocity for Layer 2, write power settings at a maximum recording velocity for Layer 1, write power settings at a maximum recording velocity for Layer 2, write power settings at a minimum recording velocity for Layer 1, and write power settings at a minimum recording velocity. for Layer 2. Such information in whole or in part can be used for adjusting write powers appropriately to Layer 1 and Layer 2.

In case of a three-layer optical disk, the disk information includes optical power related information corresponding to each of three recording layers. Likewise, in case of an N-layer optical disk, the disk information includes optical power related information corresponding to each of N recording layers.

FIG. 6 illustrates a block diagram of an optical disk apparatus such as a video disk recorder (VDR) adapted to such disk arrangements and thus represents an embodiment of the present invention. The optical disk apparatus comprises an optical pickup 50 for reading recorded signals from a dual-layered BD-RE disk 200 or for recording external input data on the BD-RE disk 200, a VDR system 51 for processing the signals received from the optical pickup 50 or for converting an input data stream into a data stream formatted for recording, and an encoder 52 for encoding an external analog input signal and outputting the encoded signal to the VDR system 51.

Figure 7:
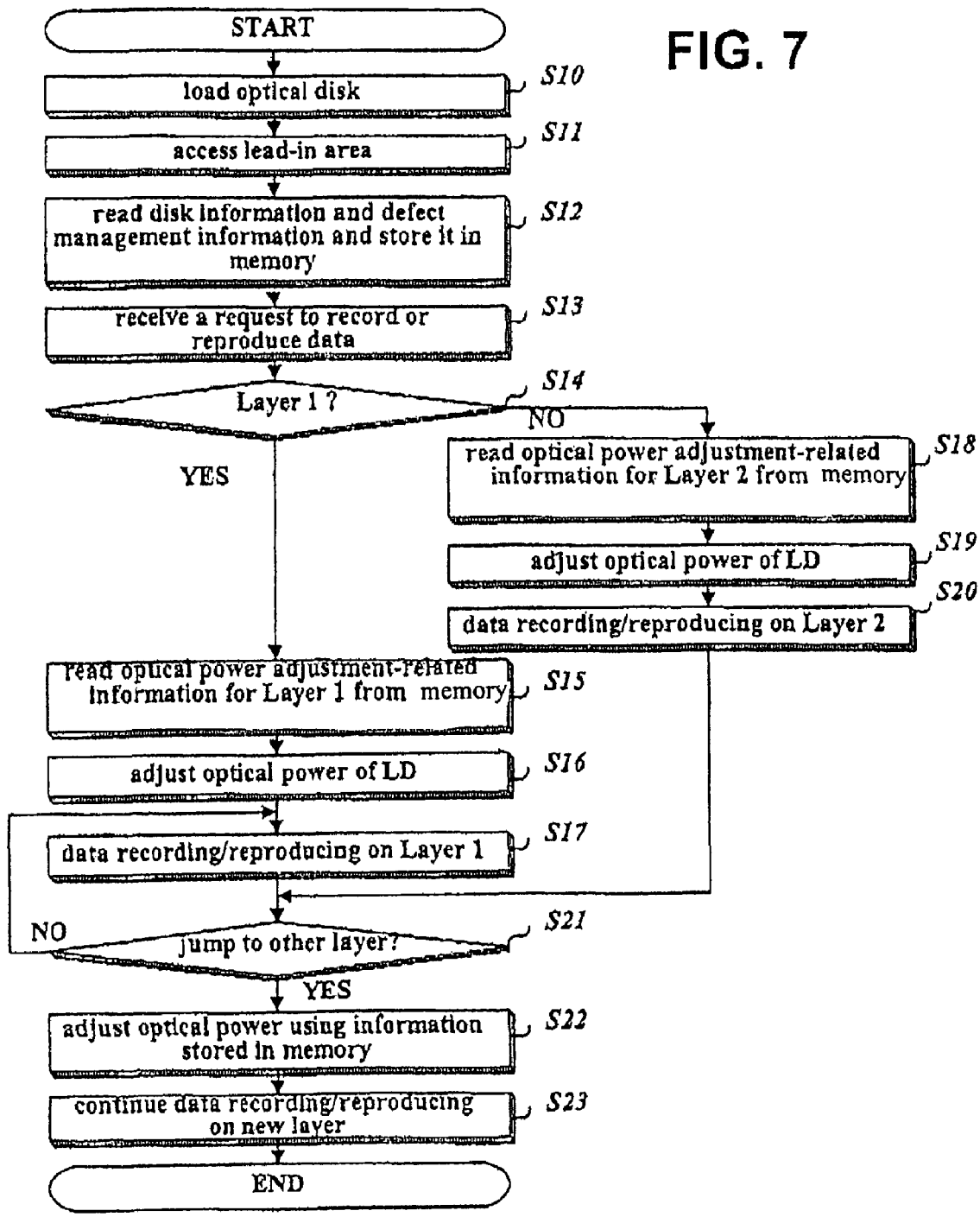
FIG. 7 illustrates a flow diagram of an optical power adjusting method in accordance with an embodiment of the present invention.

FIG. 7 illustrates a flow diagram of recording/reproducing data on/from a dual-layered BD-RE disk according to an embodiment of the present invention, e.g., BD-RE disk, 200 in the optical disk apparatus shown in FIG. 6.

Once the dual-layered BD-RE disk 200 is inserted, the VDR system 51 starts a disk loading operation (S10).

Then the optical disk apparatus accesses the lead-in area located on Layer 1 of the dual-layered BD-RE 200 by moving the optical pickup 50 (S11) and performs a pre-read/pre-write operation of reading the disk information and defect address management information (called 'DMA') recorded in the lead-in area and storing (S12) the read information in a memory 53, e.g., a volatile type of memory, contained in the optical disk apparatus 49. Optical power related information is read once by the pre-read/pre-write operation.

If a request to record data on BD-RE 200 or to reproduce data from BD-RE 200 is received (S13), the VDR system 51 examines for which layer the request is issued.

If the request is associated with Layer 1 (S14), the VDR system 51 searches the disk information stored in the memory 53 for the optical power related data for Layer 1 (S15).

Then the optical disk apparatus adjusts the read/write optical power of the LD contained in the optical pickup 50 according to the read optical power related data for Layer 1 (S16).

After the optical power adjustment operation finishes, the optical disk apparatus begins the requested read/write operation on Layer 1 (S17).

If the received request to read data or to record data is associated with Layer 2, the VDR system 51 searches the disk information stored in the memory 53 for the optical power related data for Layer 2 included in the disk information (S18), adjusts the read/write optical power of the LD according to the read optical power related data for Layer 2 (S19), and performs the requested read/write operation (S20).

If a request for a layer jump, for example, a jump from Layer 1 to Layer 2, is received while a read/write operation is being performed (S21), the VDR system 51 adjusts the optical power of the LD suitably for Layer 2 by consulting (S22) the optical power adjustment-related information for Layer 2 stored in the memory 53 before starting a read/write operation on Layer 2 (S23).

Consequently, in the case of jump operations, a data read/write operation can resume immediately after the jump operation without an additional latency, e.g., as contrasted with the Background Art.

Figure 8:
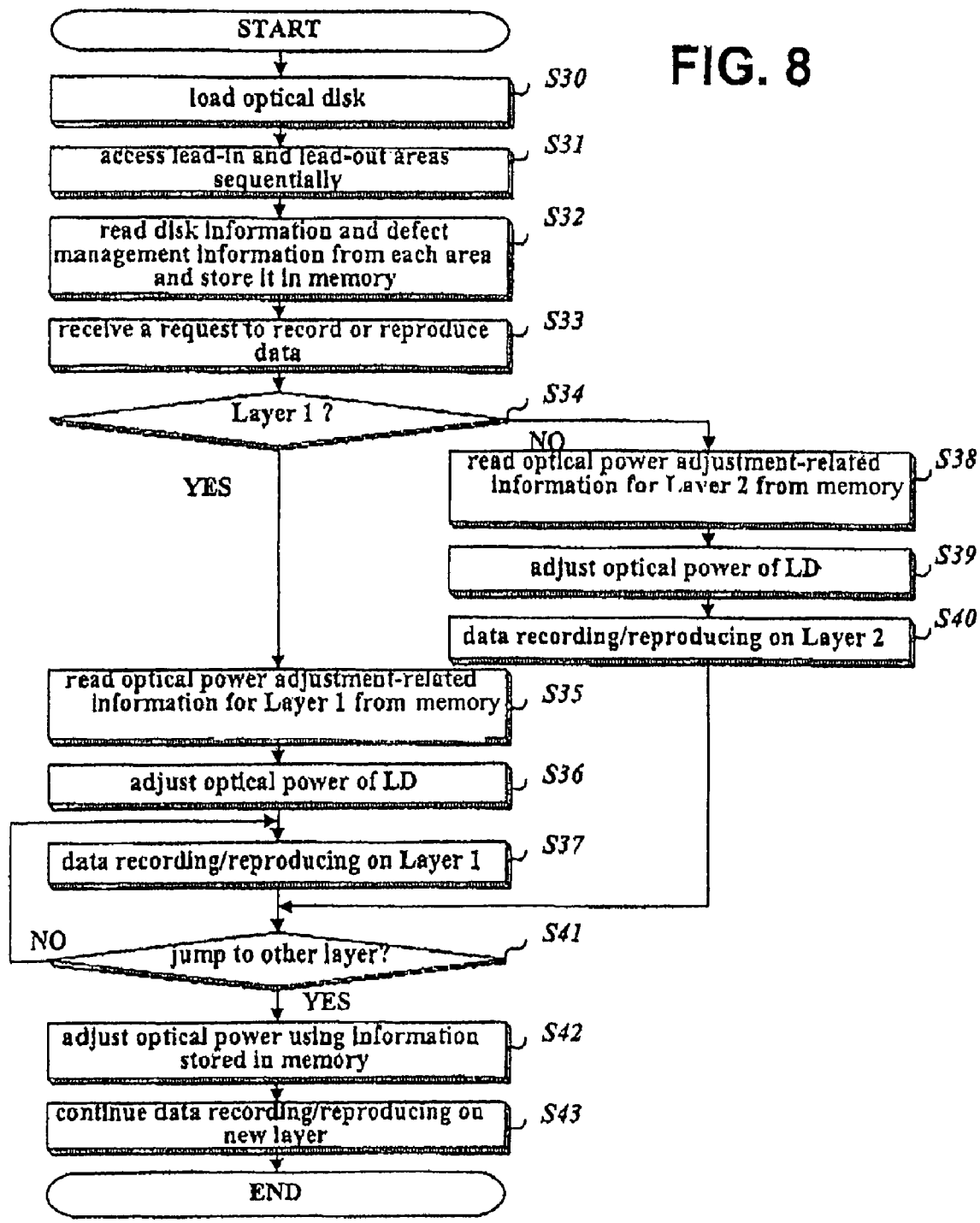
FIG. 8 illustrates a flow diagram of an optical power adjusting method in accordance with an embodiment of the present invention.

FIG. 8 illustrates a flow diagram of an optical power adjustment method in accordance with an embodiment of the present invention, wherein optical power adjustment-related information for Layer 1 is recorded only in the lead-in area of Layer 1 and optical power adjustment-related information for Layer 2 is recorded only in the lead-out area of Layer 2.

Once the dual-layered BD-RE disk 200 is inserted, the VDR system 51 starts a disk loading operation (S30).

Then the optical disk apparatus accesses the lead-in area located on Layer 1 and the lead-out area located on Layer 2 successively by moving the optical pickup 50 (S31) and reads the disk information and defect address management information to store (S32) the read information in the memory 53 contained in the optical disk apparatus 49. Disk information (including optical power-related information) recorded on every one of the recording layers is read once in this manner before the requested read/write operation.

If a request to record data on BD-RE 200 or to reproduce data from BD-RE 200 is received (S33), the VDR system 51 examines for which layer the request is issued.

If the request is associated with Layer 1 (S34), the VDR system 51 searches the disk information stored in the memory 53 for the optical power related data for Layer 1 (S35).

Then the optical disk apparatus adjusts the read/write optical power of the LD contained in the optical pickup 50 according to the read optical power related data for Layer 1 (S36).

After the optical power adjustment operation finishes, the optical disk apparatus begins the requested read/write operation on Layer 1 (S37).

If the received request to read data or to record data is associated with Layer 2, the VDR system 51 searches the disk information stored in the memory 53 for the optical power related data for Layer 2 included in the disk information (S38), adjusts the read/write optical power of the LD according to the read optical power related data for Layer 2 (S39), and performs the requested read/write operation (S40).

If a request for a layer jump, for example, a jump from Layer 1 to Layer 2, is received while a read/write operation is being performed (S41), the VDR system 51 adjusts the optical power of the LD suitably for Layer 2 by consulting (S42) the optical power adjustment-related information for Layer 2 stored in the memory 53 before starting a read/write operation on Layer 2 (S43).

Consequently, though optical power adjustment-related information for each recording layer is stored only on the corresponding layer, a data read/write operation can resume immediately after a jump operation without an additional latency, e.g., as contrasted with the Background Art.

Instead of recording the optical power adjustment-related information in the PIC data zone assigned to the lead-in and lead-out areas as described above, it is possible to record the optical power adjustment-related information in the ADIP (Address In Pregroove) encoded in wobble tracks. The ADIP formation format is as follows.

There are 56 nominal wobble lengths (NWLs) that constitute an ADIP unit. An ADIP unit has 9 different types as illustrated in FIG. 9*a*. 83 ADIP units in turn constitute an ADIP word. FIG. 9*b* illustrates the format of an ADIP word. As shown in FIG. 9*b*, an ADIP word may contain 60-bit data (nibbles c0-c14), which are recorded by encoding for error correction and hence contain 36 information bits.

There are 24 bits of the 36 information bits that are used as an ADIP address and the remaining 12 bits are used as auxiliary information. Since an ADIP word can store 12-bit auxiliary information, N ADIP words are grouped to secure a space enough for storing optical power adjustment-related information and the optical power adjustment-related information for all the layers is stored there. The information is stored repeatedly in groups of N ADIP words.

Although certain specific embodiments of the present invention have been disclosed, it is noted that the present invention may be embodied in other forms without departing from the spirit or essential characteristics thereof. The present embodiments are therefore to be considered in all respects as illustrative and not restrictive, the scope of the present invention being indicated by the appended claims, and all changes that come within the meaning and range of equivalency of the claims are therefore intended to be embraced therein.

With some embodiments of the present invention having thus been described, it will be obvious that the same may be varied in many ways. Such variations are not to be regarded as a departure from the spirit and scope of the present invention, and all such modifications are intended to be included within the scope of the present invention.

The invention claimed is:

1. An optical power adjustment method comprising:

reading, successively from respective specific areas of at least two recording layers of a multi-layer optical recording medium, control information having first optical power information for a first recording layer and second optical power information for a second recording layer, and storing the read optical power information to a memory, wherein the first and second optical power information is used for an optical power adjustment operation to obtain a write power required to record actual data in a corresponding recording layer and includes reference write power information for at least two different recording velocities, respectively;

adjusting an actual write power according to the corresponding recording layer and the corresponding recording velocity, by referring to the optical power information when data recording on a corresponding recording layer at a corresponding recording velocity are required; and if a layer jump operation to a certain recording layer is required, setting an optical power substantially immediately after the layer jump operation to a power appropriate for the certain recording layer based on reference power information for a specific recording velocity stored in the memory, wherein the setting step includes step of obtaining a write power for recording actual data based on the reference power information for the specific recording velocity stored in the memory according to the optical power adjustment operation, wherein the obtained write power is set to the optical power appropriate for the certain recording layer and the specific recording velocity.

2. The optical power adjustment method set forth in claim 1, wherein said optical power information further includes respective reference read optical power information for respective recording layers, wherein said reading step further reads the reference read optical power information for the respective recording layers from the respective specific areas of the first and second recording layers.

3. The optical power adjustment method set forth in claim 1, wherein said reference write power information includes a write power data at a normal recording velocity, a write power data at a maximum recording velocity, and a write power data at a minimum recording velocity for respective recording layers, wherein said reading step reads the respective write power data at the different recording velocities for the respective recording layers.

4. The optical power adjustment method set forth in claim 1, wherein the reading step further reads a structure information for indicating the number of recording layers formed in said optical recording medium, further comprising:
identifying the number of layers of the optical recording medium based on the structure information.

5. An optical power adjustment method comprising:
obtaining control information having optical power information to write data to an optical recording medium, successively from a specific area included in a first recording layer included on the optical recording medium and a specific area included in a second recording layer included on the optical recording medium, prior to writing data to the optical recording medium, the optical power information including a first and second optical power information being used for an optical power adjustment operation to obtain an actual write power required to record actual data in a corresponding recording layer and including reference write power information for at least two different recording velocities, respectively;
storing the obtained control information in a memory prior to write data to the optical recording medium; and
controlling a writing operation based on optical power information for a corresponding recording layer and a corresponding recording velocity,
wherein the controlling step further includes steps of referring to the optical power information for a specific recording velocity stored in the memory and adjusting an actual write power for the specific recording velocity according to the referred optical power information.

6. The method of claim 5, wherein said optical power information further includes reference read power values corresponding to the recording layer, and wherein the controlling step further includes a step of controlling a reading operation based on each of the reference read power values corresponding to the recording layer.

7. The method of claim 5, wherein respective reference write power information include write power data at a normal recording velocity, write power data at a maximum recording velocity, and write power data at a minimum recording velocity, and
wherein the controlling step controls the writing operation by referring to one of respective write power data.

8. The method of claim 6, wherein respective reference read power values include maximum DC read power data and maximum high-frequency modulated read power data.

9. The method of claim 5, wherein the controlling step includes a step of determining a target recording layer to record the actual data at the specific recording velocity based on the obtained optical power information.

10. An apparatus for adjusting optical power, comprising:
a reading/writing unit configured to read or write data to or from an optical recording medium, the reading/writing unit being configured to read control information having optical power information to write a main data to the optical recording medium, successively from a specific area included in a first recording layer and a specific area included in a second recording layer, the optical power information including first and second optical power information for the first and second recording layers and the optical power information being used for an optical power adjustment operation to obtain an actual write power required to write the main data in a corresponding recording layer, the first and second optical power information including reference write power information for at least two different recording velocities, respectively;
a storage unit configured to store the optical power information read by the reading/writing unit; and
a controller configured to control the reading/writing unit to read the optical power information from the respective specific areas of the first recording layer and the second recording layer, and control a writing operation based on the optical power information for a corresponding recording layer and a corresponding recording velocity such that an actual write power required to write the main data on the corresponding recording layer with the corresponding recording velocity is determined according to the optical power adjustment operation and control the reading/writing unit to write the main data by using the determined actual write power,
wherein the controller is configured to refer to the optical power information for a specific recording velocity stored in the storage unit and adjust an actual write power to according to a target recording layer, and the specific recording velocity.

11. The apparatus of claim 10, wherein the controller is configured to store the optical power information read by the reading/writing unit to the storage unit.

12. The apparatus of claim 10, wherein the controller is configured to move the reading/writing unit, in order to read the first and second optical power information for the first and second recording layers, at the first recording layer and the second recording layer.

13. The apparatus of claim 10, wherein the controller is configured to control the reading/writing unit to move to the corresponding recording layer, if a layer jump operation is required.

14. The apparatus of claim 10, wherein the controller is configured to control laser diode included in the reading/writing unit to adjust to the actual write power.

15. The apparatus of claim 10, wherein the specific area of the first recording layer includes a lead-in area located at inner position of the optical recording medium and the specific area of the second recording layer includes a lead-out area located at inner position of the optical recording medium, the respective specific areas including the corresponding optical power information for the corresponding recording layer, and
wherein the controller is configured to control the reading/writing unit to move toward the inner position.

16. The apparatus of claim 15, wherein the controller is configured to control the reading/writing unit to obtain the optical power information at initial operation.

17. The apparatus of claim 15, wherein the first and second optical power information is recorded respectively as wobbled pattern in the respective specific areas, the wobbled pattern comprising ADIP (Address in Pre-Groove) units and a plurality of ADIP units comprising one or more ADIP words, and the optical power information is included in the ADIP words.

18. The method of claim 10, wherein the controller is configured to the reading/writing unit to perform the writing operation by referring to the optical power information for a required recording layer and a corresponding recording velocity, if a layer jump operation is required.

19. The method of claim 1, wherein the specific area of the first recording layer includes a lead-in area located at inner position of the optical recording medium and the specific area of the second recording layer includes a lead-out area located at inner position of the optical recording medium, the respective specific areas including the corresponding optical power information for the corresponding recording layer, and wherein the reading step includes moving a reading/writing unit for reading and/or writing data toward the inner position.

20. The method of claim 19, wherein the reading step is performed when initial operation.

21. The method of claim 19, wherein the first and second optical power information is recorded respectively as wobbled pattern in the respective specific areas, the wobbled pattern comprising ADIP (Address in Pre-Groove) units and a plurality of ADIP units comprising one or more ADIP words, and the optical power information is included in the ADIP words.

22. The method of claim 5, wherein the specific area of the first recording layer includes a lead-in area located at inner position of the optical recording medium and the specific area of the second recording layer includes a lead-out area located at inner position of the optical recording medium, the respective specific areas including the corresponding optical power information for the corresponding recording layer, and wherein the obtaining step includes moving a reading/writing unit for reading and/or recording data toward the inner position.

23. The method of claim 22, wherein the obtaining step is performed when initial operation.

24. The method of claim 22, wherein the first and second optical power information is recorded respectively as wobbled pattern in the respective specific areas, the wobbled pattern comprising ADIP (Address in Pre-Groove) units and a plurality of ADIP units comprising one or more ADIP words, and the optical power information is included in the ADIP words.

25. The method of claim 5, wherein the controlling step includes controlling the writing operation by referring to the optical power information for a required recording layer and a corresponding recording velocity, if a layer jump operation is required.

26. An apparatus for optical power adjustment, comprising:

an optical pick-up configured to read, from respective specific areas of at least two recording layers of a multilayer optical recording medium, control information having first optical power information for a first recording layer and second optical power information for a second recording layer, and wherein the first and second optical power information is used for an optical power adjustment operation to obtain a write power required to record actual data in a corresponding recording layer and includes reference write power information for at least two different recording velocities, respectively;

a memory configured to store the read optical power information; and a controller configured to move the optical pickup toward the respective specific areas in order to successively read the first optical power information for the first recording layer and second optical power information for the second recording layer, to adjust an actual write power according to a corresponding recording layer and a corresponding recording velocity based on the read optical power information when data recording on a recording layer at a recording velocity is required, and to configured to control the memory to store the read optical power information, wherein the controller is configured to obtain a write power for recording actual data based on the reference power information for the specific recording velocity stored in the memory according to the optical power adjustment operation, the obtained write power being set to the optical power appropriate for the corresponding recording layer and the corresponding recording velocity, and wherein if a layer jump operation to a certain recording layer is required, the controller is configured to set an optical power substantially immediately after the layer jump operation to a power appropriate for the certain recording layer based on reference power information for a specific recording velocity stored in the memory.

27. The apparatus of claim 26, wherein the controller is configured to control the optical pickup to write data at the corresponding recording layer, if the layer jump operation is required.

28. The apparatus of claim 26, wherein the controller is configured to control laser diode included in the optical pickup to adjust to the actual write power.

29. The apparatus of claim 26, wherein the specific area of the first recording layer includes a lead-in area located at inner position of the optical recording medium and the specific area of the second recording layer includes a lead-out area located at inner position of the optical recording medium, the respective specific areas including the corresponding optical power information for the corresponding recording layer, and wherein the controller is configured to control the optical pickup to move toward the inner position.

30. The apparatus of claim 29, wherein the controller is configured to control the optical pickup to read the optical power information at initial operation.

* * * * *